United States Patent [19]

Desfontaines et al.

[11] Patent Number: 4,708,843

[45] Date of Patent: Nov. 24, 1987

[54] CONTROL UNIT FOR A NUCLEAR REACTOR

[75] Inventors: Guy Desfontaines; Michel Le Helloco, both of Paris, France

[73] Assignee: Framatome, Courbevoie, France

[21] Appl. No.: 229,227

[22] Filed: Jan. 28, 1981

[30] Foreign Application Priority Data

Feb. 8, 1980 [FR] France ................ 80 02861

[51] Int. Cl.⁴ ................ G21C 7/00; G21C 19/00
[52] U.S. Cl. ................ 376/219; 376/262; 376/289; 376/463
[58] Field of Search ........... 376/262, 263, 260, 224, 376/219, 287, 353, 347, 289, 293, 294; 98/32

[56] References Cited

U.S. PATENT DOCUMENTS

| | | | |
|---|---|---|---|
| 2,863,815 | 12/1958 | Moore et al. | 376/262 |
| 3,752,737 | 8/1973 | Frisch et al. | 376/263 X |
| 3,766,006 | 10/1973 | Frisch et al. | 376/228 |
| 3,800,685 | 4/1974 | Kitamura | 98/32 |
| 3,836,429 | 9/1974 | Frisch et al. | 376/262 |
| 3,853,699 | 12/1974 | Frisch et al. | 376/228 |
| 3,940,311 | 2/1976 | Frisch et al. | 376/353 X |
| 3,963,565 | 6/1976 | Beine | 376/294 |
| 3,977,939 | 8/1976 | Frisch et al. | 376/263 |
| 4,134,789 | 1/1979 | Aubert | 376/262 |
| 4,272,321 | 6/1981 | Betancourt et al. | 376/262 |
| 4,314,882 | 2/1982 | Etienne et al. | 376/235 |

Primary Examiner—Deborah L. Kyle
Assistant Examiner—Daniel Wasil
Attorney, Agent, or Firm—Pollock, Vande Sande & Priddy

[57] ABSTRACT

A control unit for a nuclear reactor constituted by a plurality of sealed vessels (17) communicating with the inside of the tank of the reactor (15) which they extend upwards above its cover (16); each containing a displacement mechanism for a unit absorbing neutrons in the core of the reactor. The drive motors (18) for the mechanisms are positioned in the upper part of the sealed vessels (17) within vertical aeration ducts (32). The control unit includes a supporting and insulating device for the sealed vessels (17) constituted by a vertical structure (23) fast to the cover of the tank (16), a horizontal strengthening plate (27) fixed to the upper part of the vertical structure (23) and a heat-insulating envelope (36) surrounding the sealed vessels (17) to a level below the level of the motors (18). The invention is particularly applicable to pressurized water nuclear reactors equipped with screw and nut mechanisms.

4 Claims, 2 Drawing Figures

CONTROL UNIT FOR A NUCLEAR REACTOR

The invention relates to a control unit for a nuclear reactor used for the production of electricity or for naval propulsion, including a plurality of sealed vessels in communication with the inside of the tank of the reactor, each enclosing a mechanism for moving a cluster of neutron-absorbing material in the core of the reactor.

BACKGROUND OF THE INVENTION

For controlling nuclear reactors, in particular pressurized water nuclear reactors, clusters of materials highly absorbent to neutrons are used, these being moved vertically in the core of the reactor between the fuel elements, so as to adjust the power supplied by the reactor according to the power program required.

On the other hand, these clusters of absorbent material also serve for producing the emergency shut-off of the reactor, when all the units are caused to fall into maximum insertion position of the core of the reactor.

To achieve the movement or the falling back of these clusters of absorbent material extended upwards by an operating rod of great length, displacement mechanisms cooperating with the operating rod are used, and these are arranged inside sealed vessels communicating with the inside of the tank of the reactor within which the core is located.

These sealed vessels must permit a displacement of the operating rod corresponding to a movement of the absorbent unit between its positions of maximum and minimum insertion. The amplitude of these movements corresponds substantially to the height of the fuel assemblies, i.e., in the case of currently constructed pressurized water nuclear reactors, about 4.20 m.

The displacement mechanisms, for example pawls, are driven by a driving device which is generally arranged at the lower part of the sealed vessels which extend the tank of the reactor upwards from the cover of this tank. Consequently, the height of the sealed vessels above the pawl mechanism, cooperating with the operating rod, including notches also distributed over the length of the rod, must be at least equal to the height of the fuel assemblies.

The sealed vessels of very great height must be held at their upper part by means of an anti-earthquake device constituted by a plate itself held in position by means of tie-rods arranged on the walls of the pool of the reactor. It is extremely important, in fact, to limit stresses and distortions in the mechanisms in case of earthquakes to permit the emergency shut-down of the reactor by falling back of the clusters of absorbent material in the case where the reactor undergoes seismic shocks.

This plate holding the upper part of the sealed vessels also plays the role of anti-missile plate since it is designed to stop the sealed vessels in the case when the latter would be ejected, so as to prevent any deterioration of the adjacent equipment.

It is necessary on the other hand to create, at the level of the drive devices of the mechanisms, ventilation preventing too considerable a rise in temperature under the effect of the primary fluid filling the tank of the reactor and the sealed vessels, and to cool the drive devices to enable them to operate under good conditions.

Finally, it is also necessary to heat-insulate the cover of the tank from the outer medium, in order to avoid any loss which could lower the yield of the boiler and oblige the conditioning device, for the building which encloses the reactor, to be reinforced. The control assemblies such as described above have drawbacks due to the fact that their considerable height above the cover of the tank substantially increases the height and bulk of the latter, and that the presence of anti-earthquake devices fixed to the walls of the pool of the reactor complicates operations of opening and closing the cover of the tank.

The presence of the anti-earthquake plate above the motors and at the upper part of the sealed vessels is moreover troublesome when it becomes necessary to change a faulty motor or a part of the mechanism situated in the sealed vessel, which operation must be carried out in the presence of ionizing radiation.

On the other hand, it is necessary to use a complex and bulky heat extraction device at the level of the drive devices at the lower part of the vessels.

Another drawback is that only the cover of the tank is heat-insulated, so that there is produced a considerable heat loss at the level of the sealed vessels.

SUMMARY OF THE INVENTION

It is an object of the invention to provide a control unit for a nuclear reactor including a plurality of sealed vessels, communicating with the inside of the tank of the reactor, extending this tank above its cover in the vertical direction, and each enclosing a displacement mechanism for a cluster of neutron absorbent material into the core of the reactor, driven by a drive device, this control unit being of reduced height above the cover of the tank and enabling effective protection of the sealed vessels and of the mechanisms in the case of earthquake shocks, easier dismounting and remounting of the cover of the tank, good ventilation of the drive devices for the mechanisms without the use of a complex ventilation device, effective heat-insulation of the group of sealed vessels, as well as easier access to the motors and to the mechanism placed in the sealed vessel to carry out maintenance and possible repair operations.

To this end, the drive devices are positioned at the upper part of the sealed vessels, within vertical aeration ducts, and the control unit includes a supporting and insulating device for the sealed vessels constituted by a strong vertical structure fast with the cover of the tank, occupying the whole height of the sealed vessels up to a level below the level of the drive device, a horizontal plate fixed to the upper part of the vertical structure having openings for the passage of the sealed vessels, and an envelope thermally insulating the sealed vessels from the external medium to a level below the level of the drive device.

In order that the invention may be more clearly understood, an embodiment of a control unit according to the invention will now be described with reference to the accompanying drawings, purely by way of illustrative example, in comparison with a control unit according to the prior art.

DESCRIPTION OF A PREFERRED EMBODIMENT

Figure 1:
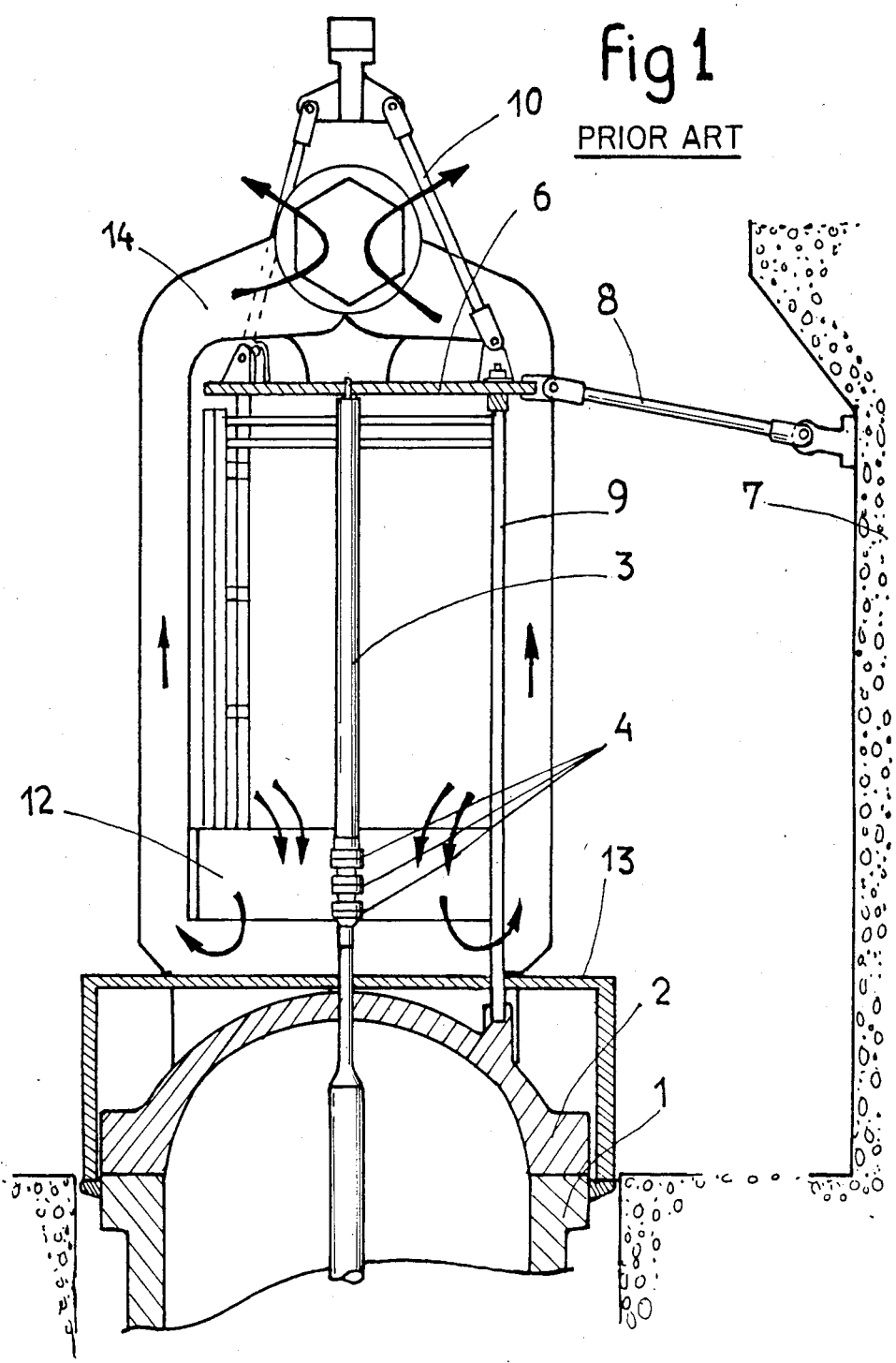
FIG. 1 shows, in a sectional view through a vertical plane, a control unit according to the prior art.

In FIG. 1 is seen a tank 1 of a pressurized water nuclear reactor closed at its upper part by a hemispherical cover 2, traversed by a sealed vessel 3 within which a pawl mechanism 4 is arranged enabling the displacement of an operating rod of great length, at the lower part of which is fixed an absorber unit which can be moved inside the reactor by the device 4.

Only one vessel 3 has been shown, but it will be understood that the control unit of the reactor includes a large number of devices each enabling the displacement of an absorber unit.

The sealed vessels 3 are connected at their upper part to an anti-earthquake plate 6 of high strength itself held with respect to the wall 7 of the pool of the reactor by a set of anti-earthquake bracing rods 8.

A set of lifting rods 9 enables the raising of the cover of the tank by a lifting unit 10 which can be coupled to the travelling bridge crane serving the reactor.

A ventilating skirt 12 and ventilating devices (not shown) enable cooling air to be circulated at the level of the driving mechanism and device 4.

A heat-insulating jacket 13 enables the cover 2 of the tank to be thermally insulated from the outside medium.

If it is desired to lift the cover of the tank, it is necessary to dismount the anti-earthquake bracing rods 8 connecting the plate 6 to the walls of the pool as well as the ventilation ducts connecting the ventilating devices to the ducts 14 and to carry out the raising of a complex and extremely heavy unit with the lifting device 10.

It is also necessary to arrange a forced ventilating system at the level of the motors 4, although the heat loss at the level of the sealed vessel over the whole portion of this sealed vessel situated above insulating jacket 13 is extremely large.

On the other hand, the height of the sealed vessel 3 above the mechanisms 4 must be at the minimum equal to the height of the fuel assemblies, which increases all the more the bulk of the tank of the reactor or of its cover.

It must finally be noted that any intervention or change of part in the motor or the mechanism situated in the sealed vessel necessitates the prior dismounting and removal of the anti-earthquake plate.

Figure 2:
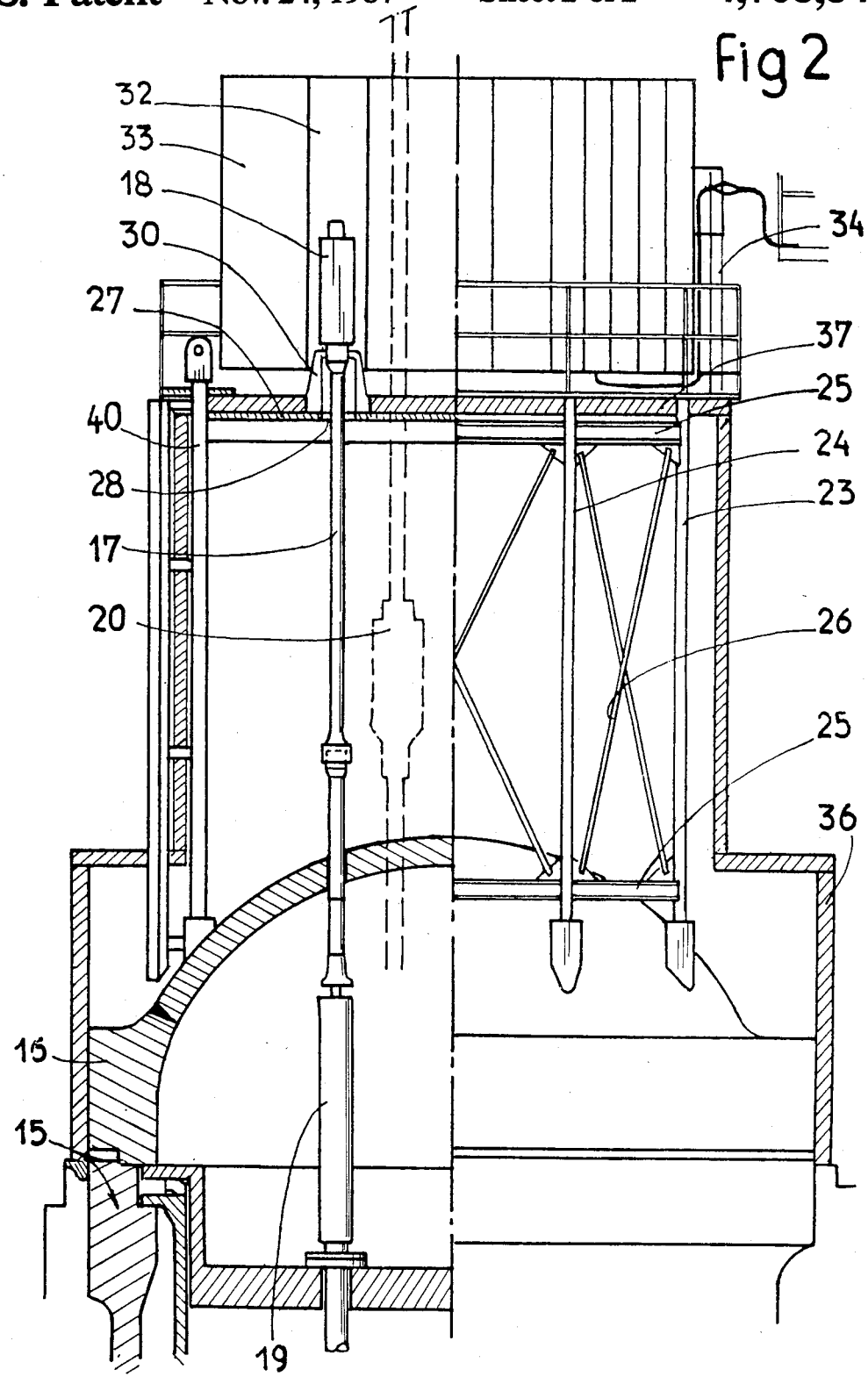
FIG. 2 shows, in half-sectional view through a vertical plane, an embodiment of a control unit according to the invention.

Referring to FIG. 2, an embodiment of the control unit according to the invention is seen, of which also only a single sealed vessel has been shown.

The cover 16 of the tank 15 is traversed by this sealed vessel 17 extending the tank upwards to a certain height.

The driving mechanism of the control cluster in its vertical movement inside the core is constituted by a screw and nut device at least partly positioned below the cover 16 of the tank, which enables the height of the sealed vessel above the cover of this tank to be reduced.

The rotary movement of the nut driving the screw in a translation movement is transmitted to this nut positioned beneath the cover of the tank from the motor 18 located at the upper part of the sealed vessel 17.

The screw driven in translation is connected to an intermediate rod enabling the fastening of the absorber cluster to the mechanism.

A cluster support 19 enables the guidance of the cluster when the latter is extracted from the core of the reactor over a sufficient length.

For comparison, there is shown, in dashed lines, a sealed vessel 20 associated with a driving device located in the lower portion of this sealed vessel, such as that used in the devices of the prior art.

It is seen that this vessel 20 occupies a much greater height above the cover of the tank than the height occupied by the vessel 17. A strong vertical structure 23 is fixed to the cover 16 of the tank and is extended upwards to a level somewhat below the level of the sealed vessels such as 17 where the driving devices 18 are located. This structure 23 includes high strength vertical elements 24 and horizontal elements 25 constituting a polygonal contour at the lower part and at the upper part of the prismatic shaped structure 23.

The stiffener elements 26 provide for the rigidity of the whole of the structure 23.

A horizontal plate 27 rests on the horizontal elements 25 at the upper part of the structure and includes openings 28 for the passage of the upper parts of the sealed vessel 17. The openings 28 permit passage of the vessels 17 with a certain play, so that the vessels can move freely under the effect of thermal expansion and of the deformations of the tank cover. In fact, the tank of the reactor and of the sealed vessels contain water under high pressure and at high temperature, so that deformations are possible during the operations of the reactor.

An adapter part 30 provides the connection between the plate 27 and the sealed vessel 17 and enables shocks between them to be damped in the case of earthquake.

The motors 18 are generally constituted by an immersed rotor located inside the vessel 17 whose axle rotates the nut of the screw-nut mechanism through a driving part and through a stator located outside the sealed vessel. The motor 18 and the corresponding portion of the vessel are placed inside a duct 32 which permits ventilation of the motor 18 by natural draft.

The group of ducts such as 32 associated with each of the mechanisms arranged in a sealed vessel constitutes a dismountable unit structure 33 fixed by means of a support 34 to the upper portion of the vertical structure 23.

The assembly 33 constituted by the ducts 32 is arranged a little above the horizontal plate 27 assuring the holding of the upper part of the sealed vessels 17 in case of earthquake.

An enclosure 36 of insulating material permits the thermal insulation of the cover of the tank and of the part of the sealed vessel 17 located below the motor 18, with respect to the external medium.

This heat-insulating envelope 36 of large size hence encloses the group of sealed vessels 17 passing through the cover 16 of the tank. The envelope 36 is closed at its upper part by a horizontal insulating plate 37 positioned on the strengthening plates 27 and including openings corresponding to each of the sealed vessels containing a mechanism.

Vertical tie-rods 40 enable the raising of the cover of the tank by means of a lifting device such as the device 10 shown in FIG. 1.

It is seen that the vertical strengthening structure 23 and the plate 27 enable an anti-earthquake protecting device for the control unit of the reactor to be constituted, without the use of tie-rods fixed to the walls of the pool of the reactor.

In addition, the position of the motor above the anti-earthquake plate and the free access to the upper part of the sealed vessel enables maintenance operations on the motor and on the mechanism situated inside the sealed vessel to proceed without the necessity of previously dismounting the anti-earthquake plate. This is very advantageous since these operations are carried out in the presence of ionizing radiation.

On the other hand, it could be necessary to provide an anti-missile protective slab of reinforced concrete positioned above the pool of the reactor for the protection of the latter.

In contrast, the use of ducts 32 for the ventilation of the motors 18 obviates use of forced ventilation according to the devices of the prior art.

With ducts of 2 m in height, a draft enabling an exchange coefficient between the air and the metal of the order of 10 watts per m² and per degree C. has been achieved. This, combined with the use of a screw-nut unit which has a high reduction ratio, and which consequently enables the driving power necessary to effect the movement of the cluster to be limited, leads to an equilibrium temperature in the coils of the motor below 300° C.

During handling of the tank cover, it is possible to limit the height of the assembly which must be lifted by dismounting the assembly 33 holding the ventilation ducts 32 of the motors. This one-piece and light assembly can easily be separated from the remainder of the control unit.

It will be seen that the principal advantages of the device according to the invention are the reduction in height above the cover of the tank of the control unit, the elimination of anti-earthquake braces fixed to the walls of the reactor, easy access to the motor and to the mechanism situated in the sealed vessel, natural cooling of the motors in the aerating ducts, efficient heat insulation of the sealed vessels enclosing the mechanisms, and faster and easier handling of the cover of the tank.

The invention is not limited to the embodiment which has just been described, but also comprises all modifications thereof.

Thus, it is possible to construct the strengthening structure fast to the cover of the tank in a form different from that of a framework structure as in the example which has been described. It is possible, for example, to build this structure in the form of a strong sheath, or, if it is desired to preserve a framework, to add tranverse reinforcements passing between the sealed vessels if the height of the sealed vessels cannot be reduced by the use of a screw-nut device located beneath the cover of the tank.

It is also possible to construct the aeration ducts of the motors in a form different from the one-piece unit which has been described which, however, has the advantage of enabling dismounting of a group of ducts corresponding to the group of mechanisms.

It is also possible to construct a heat insulation for the sealed vessels, not by using not a single insulating material for the group of vessels, but by separately insulating each of these vessels with an insulating material.

Finally, the control unit according to the invention can be used not only for a pressurized water nuclear reactor with a control moving absorber clusters by means of a screw-nut mechanism, but also for any other nuclear reactor where the control is carried out by vertical movement of clusters of absorber material in the core of the reactor, and/or the displacement mechanisms for the clusters of absorbent material are positioned in sealed vessels communicating with the inside of the tank of the reactor.

What is claimed is:

1. Control unit for a nuclear reactor having a tank, comprising
   (a) a plurality of sealed vessels communicating with the inside of said tank so as to extend said tank, above its cover, in the vertical direction, each of said sealed vessels containing a displacement mechanism for a cluster of material absorbing neutrons in the core of said reactor, driven by a driving device comprising a motor positioned in the upper part of said sealed vessel;
   (b) a strong vertical structure fast to said cover of said tank occupying the height of said sealed vessels to a level below said motors;
   (c) a horizontal protection plate fixed to the upper part of said vertical structure at a level below said motors and having openings for the passage of said sealed vessels;
   (d) an envelope insulating said sealed vessels from the external medium to a level below said motors; and
   (e) a plurality of vertical aeration ducts positioned above said horizontal protection plate and, each surrounding a motor.

2. Control unit according to claim 1, wherein said vertical structure is constituted by a frame comprising vertical elements, horizontal elements at its lower part and at its upper part and reinforcing elements.

3. Control unit according to claim 2, wherein said protection plate rests on horizontal elements of said frame arranged at the upper part of the latter.

4. Control unit according to any one of claims 1 to 3, wherein said aeration ducts constitute a one-piece unit fixed to said vertical structure and separable from the latter.

* * * * *